US007472357B1

(12) United States Patent
Satterfield et al.

(10) Patent No.: US 7,472,357 B1
(45) Date of Patent: Dec. 30, 2008

(54) METHOD AND APPARATUS FOR MANAGING LIST ITEMS

(75) Inventors: Jesse Clay Satterfield, Seattle, WA (US); Jensen Michael Harris, Kirkland, WA (US); Jiaxin Wang, Redmond, WA (US); Richard Henry Leukart, III, Seattle, WA (US); George Arthur Herbert, III, Kirkland, WA (US); Martijn Eldert van Tilburg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 723 days.

(21) Appl. No.: 10/454,413

(22) Filed: Jun. 4, 2003

(51) Int. Cl.
*G06F 3/00* (2006.01)

(52) U.S. Cl. .................. 715/859; 715/752; 715/783; 715/788; 715/861; 709/206

(58) Field of Classification Search ............... 709/206; 715/752, 783, 788, 859, 861
See application file for complete search history.

(56) References Cited

U.S. PATENT DOCUMENTS 5,923,848 A * 7/1999 Goodhand et al. .......... 709/219
6,212,553 B1 4/2001 Lee et al. .................. 709/206
2002/0188683 A1* 12/2002 Lytle et al. ................ 709/206

OTHER PUBLICATIONS

Kiu, K.S.; Baecker, R.; Silver, N.; Long, B., "A Time-Based Interface For Electronic Mail and Task Management," Design of Computing Systems: Cognitive Consideration. Proceedings of the Seventh International Conference on Human-Computer Interaction (HCI International '97, San Francisco, CA), vol. 2, Aug. 1997, p. 19-22.

* cited by examiner

*Primary Examiner*—Weilun Lo
*Assistant Examiner*—Mylinh Tran
(74) *Attorney, Agent, or Firm*—Merchant & Gould

(57) ABSTRACT

A method, apparatus, and a user interface for managing and prioritizing items in a list are provided. Each item in the list is associated with and displayed adjacent to a user interface control for flagging the associated list item. When selected, the user interface control is operative to flag the corresponding list item. Moreover, the user interface control is further operative to change its visual state to indicate that the corresponding list item is flagged. List items flagged by other users appear differently. When again selected, the user interface control is further operative to remove the flagged state for the corresponding item and to set the state of the item as completed.

23 Claims, 11 Drawing Sheets

| STATE | FLAG TYPE | FLAG STATUS | REMINDER | STATE AFTER ONE CLICK |
|---|---|---|---|---|
| 1 | EXISTS | FLAGGED | NONE | iconID=NONE ; FLAGstatus = COMPLETED |
| 2 | EXISTS | FLAGGED | EXISTS | iconID=NONE ; FLAGstatus = COMPLETED |
| 3 | EXISTS | NONE | NONE | iconID = NONE |
| 4 | EXISTS | NONE | EXISTS | FLAGstatus = COMPLETED |
| 5 | EXISTS | COMPLETED | NONE | iconID=NONE |
| 6 | EXISTS | COMPLETED | EXISTS | iconID=NONE ; reminder = NONE |
| 7 | NOT EXISTS | FLAGGED | NONE | iconID=DEFAULTiconID |
| 8 | NOT EXISTS | FLAGGED | EXISTS | iconID=DEFAULTiconID |
| 9 | NOT EXISTS | NONE | NONE | iconID=DEFAULTiconID; FLAGstatus = FLAGGED |
| 10 | NOT EXISTS | NONE | EXISTS | iconID=DEFAULTiconID; FLAGstatus = FLAGGED |
| 11 | NOT EXISTS | COMPLETED | NONE | iconID=DEFAULTiconID; FLAGstatus = FLAGGED |
| 12 | NOT EXISTS | COMPLETED | EXISTS | iconID=DEFAULTiconID; FLAGstatus = FLAGGED |

*Fig. 9.*

METHOD AND APPARATUS FOR MANAGING LIST ITEMS

TECHNICAL FIELD

The invention generally relates to the field of computer user interfaces and, more specifically, to the field of user interfaces for managing items in a list.

BACKGROUND OF THE INVENTION

As the use of electronic mail ("e-mail") has become more and more pervasive, users have become inundated with an ever increasing volume of e-mail messages. In order to deal with the increased volume of e-mail messages, many users utilize their e-mail inbox as a task list. For instance, for many users, the fact that an e-mail message is present in their inbox, as opposed to another folder, indicates that some action remains to be taken with respect to the e-mail message. Other users mark e-mail messages as having been read or unread in order to indicate the status of the messages. Some other users even aggressively file e-mail messages into separate folders to keep track of e-mail messages that represent pending task items.

Although these methods for managing an e-mail inbox as a task list suffer from a number of drawbacks, users have not been previously provided with a meaningful alternative. For instance, previous e-mail application programs provided users the ability to associate a flag with an e-mail message. However, in order to flag an e-mail message, a user was required to perform the time consuming step of opening a dialog box and associating the flag with the message through the dialog box. Moreover, the flag status of an e-mail message may be set by the sender of an e-mail message. Accordingly, when messages flagged by other users are received and combined with other flagged messages, confusion is likely to result. Accordingly, the previous application programs for managing e-mail messages have not provided meaningful tools for managing and prioritizing lists of e-mail messages.

It is with respect to these considerations and other that the various embodiments of the present invention have been made.

SUMMARY OF THE INVENTION

In accordance with the present invention, the above and other problems are solved by a method, apparatus, and user interface for managing a list of items ("list items"), such as a list of e-mail messages. By providing a robust user interface for easily flagging items in a list and for identifying flagged items in a list, the various aspects of the invention overcome the problems found in previous solutions for managing and prioritizing list items.

In accordance with other aspects, the present invention relates to a user interface for managing and prioritizing items in a list. Each item in a list is associated with and displayed adjacent to a user interface control for flagging the associated list item. When selected, the user interface control is operative to flag the corresponding list item. When a list item is "flagged" a user interface control associated with the item is operative to provide a visual state reflecting the flagged status of the list item and to change the visual state to indicate that the corresponding list item is flagged. The visual display allows a user to easily determine which items have been flagged and remain to be dealt with. List items flagged by other users appear differently than items flagged by a local user. When again selected, the user interface control is further operative to remove the flagged state for the corresponding item, to set the state of the item as completed, and to modify the visual state to indicate that the item has been completed.

In accordance with still other aspects, the present invention relates to a user interface for managing a list that includes one or more items. Each item in the list is displayed. A user interface control associated with each item in the list is also displayed adjacent to each item. The user interface control provides a visual display to a user that indicates the flagged state of the item. The visual display provided by the user interface control initially indicates that the corresponding list item is not flagged. When a first selection of the user interface control is received, the user interface item is operative to modify its visual display to indicate that the item associated with the selected user interface control has been flagged. When a second selection of the user interface control is received, the user interface control is operative to modify its visual display to indicate that the corresponding list item is completed.

According to additional aspects of the invention, the user interface control is operative to receive a request to change a color of its visual display. In response to the request, the user interface control may display one or more selectable colors and receive the selection of one of the colors. In response to the selection, the visual display may be modified based on the selected color. The user interface control is also operative to receive a request to associate a reminder with a list item. In response to such a request, the user interface control is operative to receive reminder parameters, such as a date and time for completion of the item and further operative to associate a reminder with the selected item in the list.

According to other aspects of the invention, a request may be received to search for items in the list having a specified color of the visual display provided by the user interface control. In response to such a request, the list items having a corresponding user interface control providing a visual display with a color equivalent to the specified color are located and displayed. Similarly, a request may be received to sort the items in the list based on the color of the display provided by the user interface control. In response to such a request, the list may be sorted based upon the color of the display provided by each user interface control associated with an item in the list.

According to yet another aspect of the invention, items in a list may be sorted into one or more folders. A request may be received to display items located in any of the folders having a display provided by a corresponding user interface control of a specified color. In response to the request, each of the folders may be searched for items having a display provided by user interface control with a color equivalent to the specified color. These items may then be display to a user.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE DRAWINGS

FIG. 9 illustrates the various state transitions utilized by a user interface control provided in one embodiment of the invention.

DETAILED DESCRIPTION OF THE INVENTION

Figure 1:
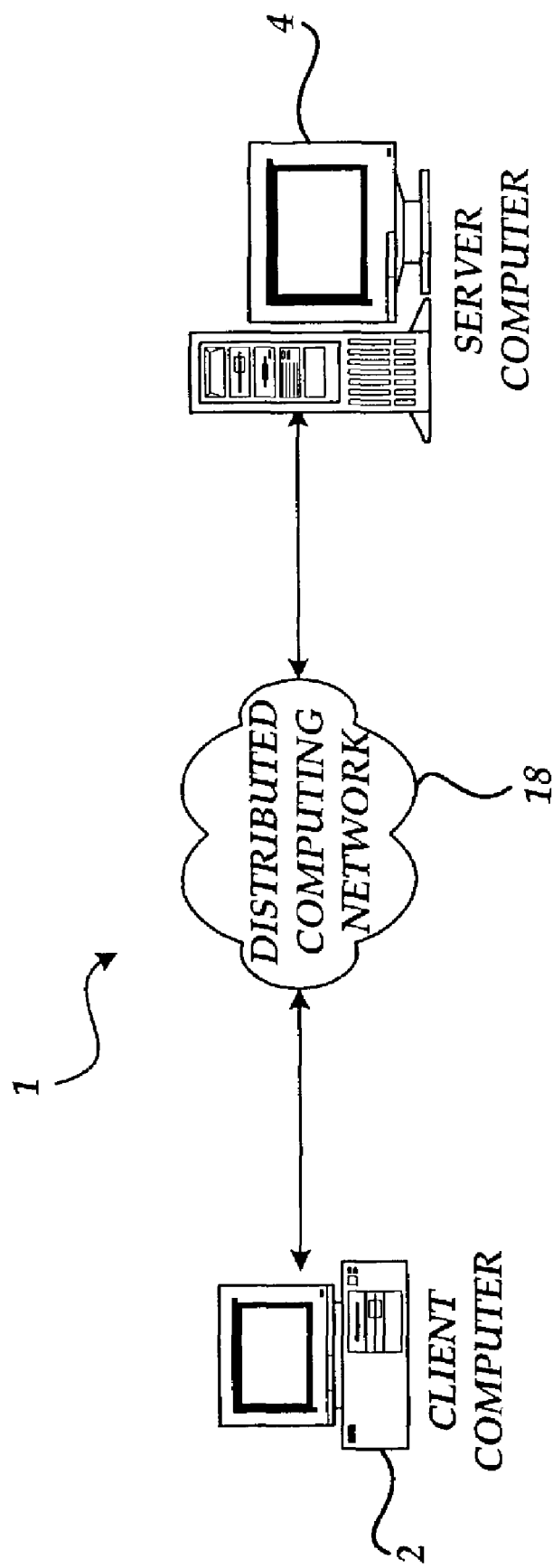
FIG. 1 is a computer system architecture diagram illustrating a computer system utilized in and provided by the various embodiments of the invention.

Referring now to the drawings, in which like numerals represent like elements, a computer hardware and software architecture utilized by a computer system provided in the various embodiments of the invention will be described. In particular, FIGS. 1 and 2 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative operating environment for the various embodiments of the invention will be described. As shown in FIG. 1, a client computer 2 is provided that is connected to a distributed computing network 18. According to the various embodiments of the invention, the client computer 2 comprises a standard desktop, laptop, or notebook computer operative to communicate with other computer systems via the network 18. In particular, the client computer 2 is operative to communicate with the server computer 4. The client computer 2 is also operative to store and execute one or more software components including a personal information manager ("PIM") client component. The PIM client component may be stored upon a hard disk drive or other type of storage medium located at or accessible by the client computer 2.

As known to those skilled in the art, a PIM client component 10 is operative to provide the functionality for managing a user's personal information data. For instance, a standard PIM client component is operative to provide functionality for managing a calendar, e-mail messages, contacts, tasks, notes, to do items, and other information. In particular, the PIM client component is operative to communicate with a PIM server component to, among other things, retrieve e-mail messages from the server computer 4. As will be described in greater detail below, e-mail messages received at the client computer 2 may be displayed in a list. Moreover, functionality may be provided for managing the items in the list. Additional details regarding this functionality will be provided below.

Figure 2:
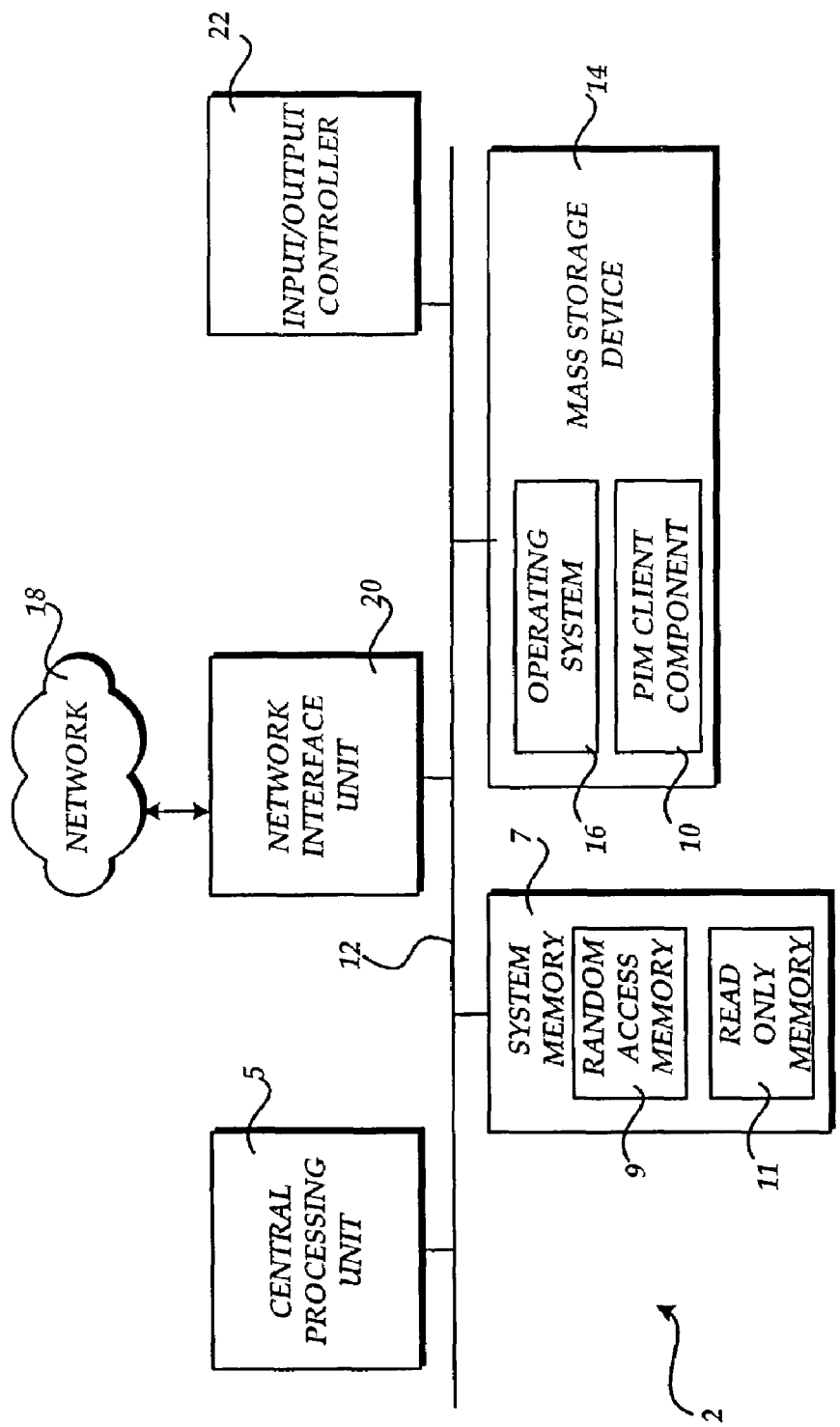
FIG. 2 is a computer architecture diagram showing an illustrative hardware and software architecture for a client computer provided in the various embodiments of the invention.

Turning now to FIG. 2, an illustrative computer architecture for a client computer 2 utilized in the various embodiments of the invention will be described. The computer architecture shown in FIG. 2 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The client computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media, provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the client computer 2 or the server computer 30, described below.

According to various embodiments of the invention, the client computer 2 may operate in a networked environment using logical connections to remote computers, such as the server computer 30, through a network 18, such as the Internet. The client computer 2 may connect to the network 18 through a network interface unit 20 connected to the bus 12. It should be appreciated that the network interface unit 20 may also be utilized to connect to other types of networks and remote computer systems. The client computer 2 may also include an input/output controller 22 for receiving and processing input from a number of other devices, including a keyboard, mouse, or electronic stylus (not shown in FIG. 2).

Similarly, an input/output controller 22 may provide output to a display screen, a printer, or other type of output device.

As mentioned briefly above, a number of program modules and data files may be stored in the mass storage device 14 and RAM 9 of the client computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a PIM client component 10. As described briefly above, the PIM client component 10 comprises an executable software component operative to provide functionality for managing personal information, include e-mail messages. According to one embodiment of the invention, the PIM client component client 10 comprises the OUTLOOK messaging and PIM application from MICROSOFT CORPORATION of Redmond, Wash. It should be appreciated that embodiments of the invention may be implemented in other types of PIM and e-mail clients from other manufacturers.

It should be appreciated that the server computer 4 may also include all of the conventional components shown in FIG. 2. Moreover, as discussed briefly above, the server computer 4 is operative to execute a PIM server component (not shown). The PIM server component is operative to communicate with the PIM client component 10. Through this communication, the PIM server component is operative to transmit e-mail messages and other types of messages to the PIM client component 10. According to one embodiment of the invention, the PIM server component comprises the EXCHANGE messaging and collaboration server application from MICROSOFT CORPORATION of Redmond, Wash. It should be appreciated, however, that the PIM server component 24 may comprise other types of messaging and collaboration server components available from other manufacturers.

Figure 3:
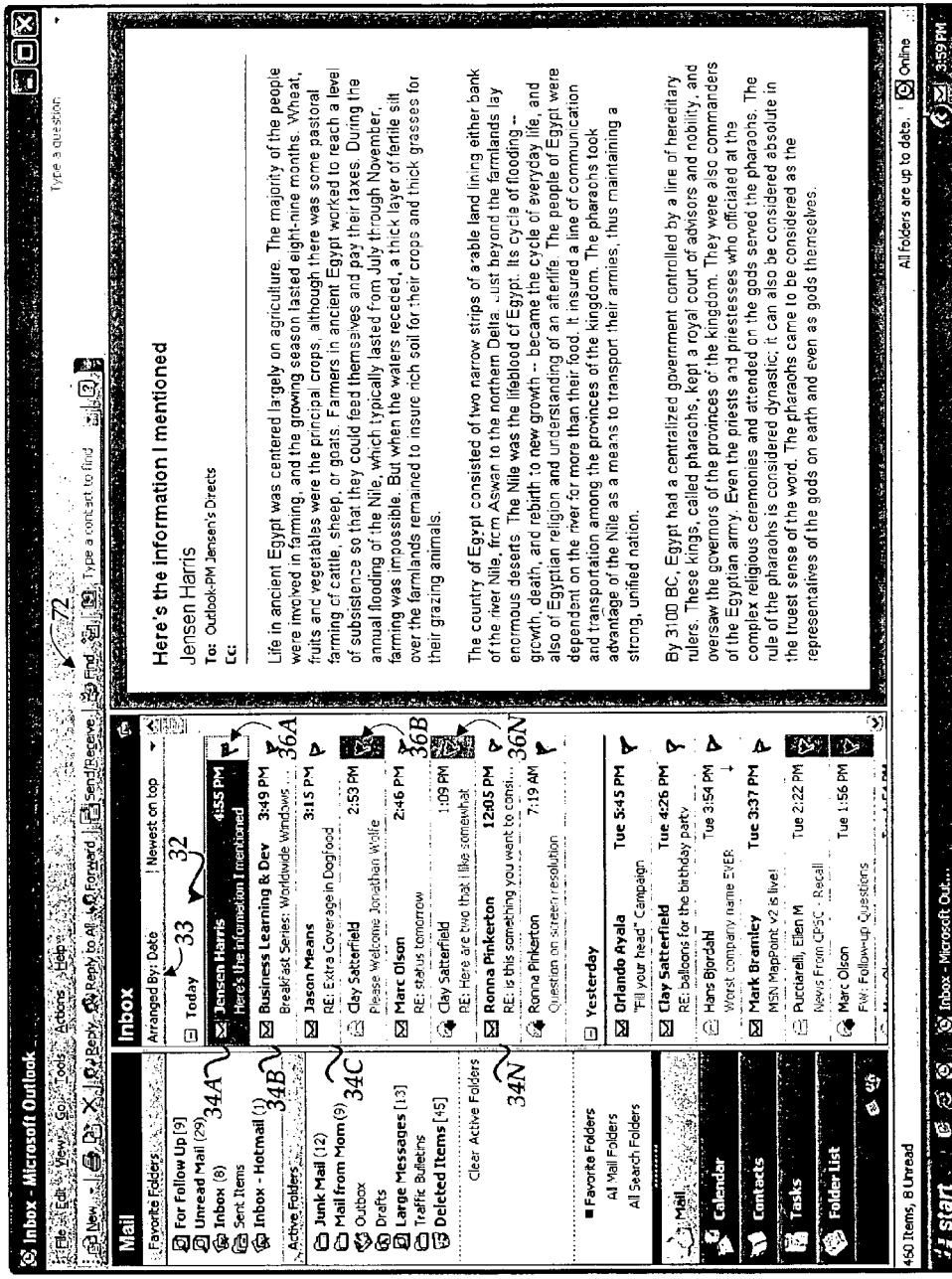
FIGS. 3-8 are screen diagrams illustrating various user interface components provided by the embodiments of the present invention.

Referring now to FIG. 3, an illustrative screen display 30 provided by a PIM client component 10 in one of the embodiments of the invention will be described. As shown in FIG. 3, the screen display 30 includes many of the conventional components provided by a user interface for a PIM client component 10. In addition, the screen display 30 includes a list 32 identifying a number of e-mail messages contained in a selected folder. Each item 34A-34N in the list 32 includes an identification of the sender of the e-mail message, the reference line as specified by the sender of the e-mail message, an icon indicating that the item is an e-mail message, and the time the e-mail message was received. As known to those skilled in the art, other information may be displayed in the list 32 regarding the contents and status of the e-mail messages.

It should be appreciated that, although the various embodiments of the invention are described in the context of a list 32 comprising e-mail items, the various aspects of the invention described herein may be applied equally to other types of displayed lists. For instance, the embodiments of the invention may apply equally to lists containing calendar items, to-do items, notes, and other types of items. Nothing contained herein should be read as restricting the aspects of the invention to an application utilizing a list of e-mail items.

As also shown in FIG. 3, each of the items 34A-34N in the list 32 include a user interface control 36A-36N displayed next to corresponding item in the list 32. Each of the user interface controls 36A-36N are operative to provide a visual display adjacent to the corresponding item 34A-34N indicating the flagged state of the item.

Separate visual displays may be provided by the user interface controls 36A-36N for indicating that a message has not been flagged, for indicating that a message was flagged by another user, for indicating that a message has been flagged, or for indicating that message has been unflagged and is completed. As will be described in greater detail below, a user may be permitted to select a color to be applied to the visual display provided by the user interface controls 36A-36N. In this manner, each of the items 34A-34N may be flagged with a visual display of a different color. As will also be discussed in greater detail below, the items in the list 32 may be sorted based on the color of the visual display provided by the user interface controls 36A-36N by selecting the button 33. Moreover, items may be searched for based on the color of the visual display provided by the user interface control by selecting the button 72.

Figure 4:
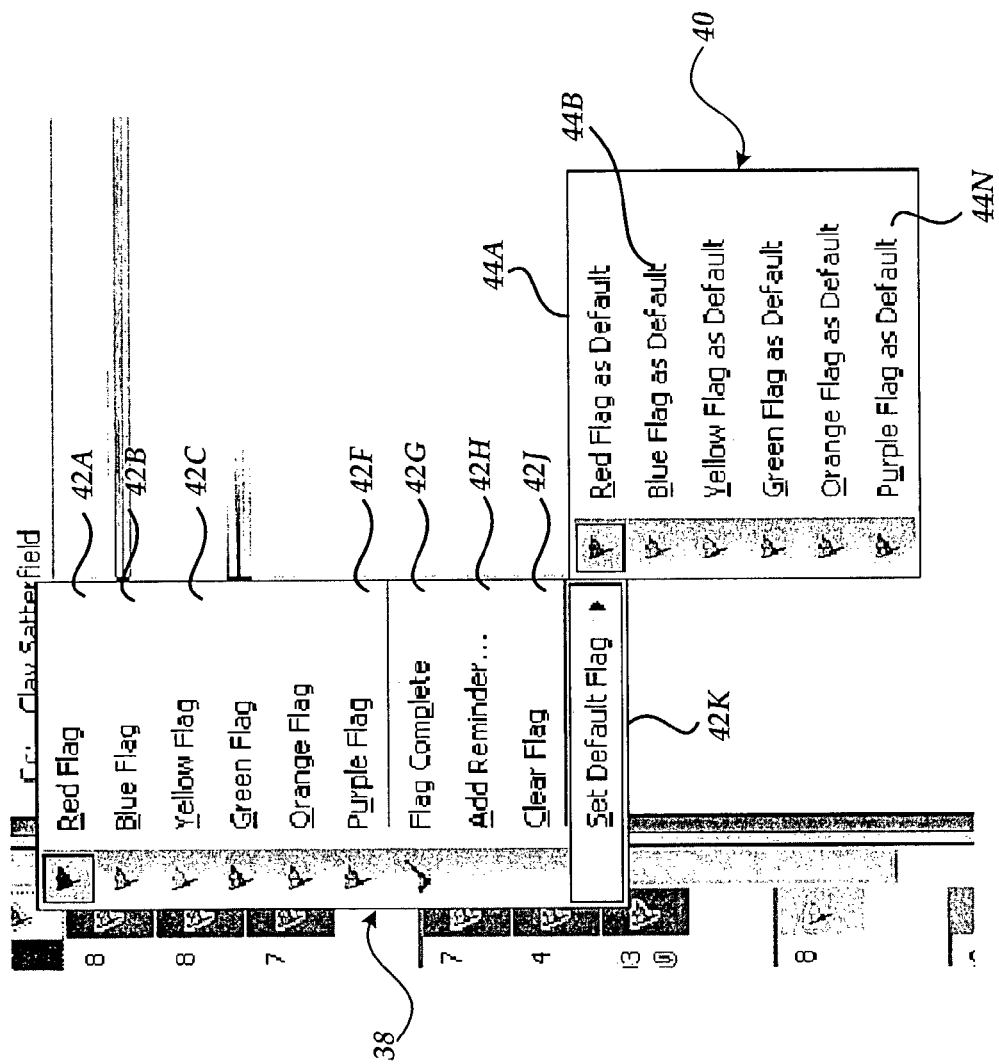

Referring now to FIG. 4, additional details regarding the operation of the user interface controls 36A-36N will be provided. As discussed briefly above, the user interface controls 36A-36N may be selected by a user to change the visual state of the display that indicates the flagged state of each of the items 34A-34N. In particular, a user may utilize a mouse, other types of pointing device, a keyboard, or other user input device to select one of the user interface controls 36A-36N. In response to the selection, the user interface control is operative to change its visual state. For instance, if a user interface control 36A showing a default state is selected, the visual display provided by the user interface control will change to a flagged state and a reminder will be set for the corresponding item. If the visual display provided by the user interface control is again selected, the display will change to a completed state and the reminder will be deleted.

The selections described above are typically accomplished by a user selecting one of the user interface controls 36A-36N utilizing a left mouse button or corresponding keyboard key. Alternatively, a user may select one of the user interface controls 36A-36N using a right mouse button or corresponding keyboard key. In response to the selection of one of the user interface controls 36A-36N utilizing a right mouse button or corresponding keyboard key, the menu 38 shown in FIG. 4 will be displayed by the user interface control. The menu 38 includes menu items 42A-42F for modifying a color of the visual display provided by the selected user interface control. For instance, if the menu item 42A is selected, the visual display provided by the selected user interface control will be changed to the color red. Similarly, if the menu item 42B is selected, the visual display provided by the selected user interface control will be changed to the color blue. It should be appreciated that other colors, color patterns, and other types of visual indicators may be applied to the visual display provided by the selected user interface control.

The menu 38 also includes a menu item 42G for flagging the item corresponding to the selected user interface control as completed. A selection of the menu item 42G will result in the item being flagged as completed and the visual state provided by the user interface control being modified to indicate a completed status. The reminder associated with the item is also deleted.

The menu 38 also includes a menu item 42H for adding a reminder to the selected item. In response to the selection of the menu item 42H, a user interface dialog box is provided by the user interface control. Utilizing this dialog box, a user can specify parameters associated with the reminder, such as a time and date for completion of the selected item. Additional details regarding the provision of a reminder and a user interface dialog box for receiving reminder parameters are provided below with respect to FIG. 6.

The menu 38 also includes a menu item 42J for clearing the visual display provided by the user interface control for the selected item. In particular, a selection of the menu item 42J will return the visual state provided by the user interface control to its default state. For instance, as shown in FIG. 3, the visual indication of the user interface controls 36A-36N comprises the shape of a flag. A flag corresponding to an item that has not yet been completed is colored in the manner described above, while an unflagged item is "ghosted" or "grayed" out. If the menu item 42J is selected for a flagged item, the item will be returned to its default "grayed" out state.

The menu 38 also includes a menu item 42K for setting the status of a default visual display provided by the user interface control when the item is selected. In particular, when the menu item 42K is selected, a submenu 40 is displayed including a number of menu items 44A-44N. Each of the menu items 44A-44N includes a selection indicating the color of the visual display provided by the user interface control when initially selected by a user. For instance, if the menu item 44A is selected, the visual display initially provided by the user interface control for a selected item will be in the color red. Similarly, the menu item 44B, when selected, will cause the visual display provided by the user interface control for a particular item to be in the color blue when initially selected. It should be appreciated that other types of colors, color patterns, and visual indicators may be utilized and specified as a default setting for the visual display provided by the user interface controls 36A-36N.

Figure 5:
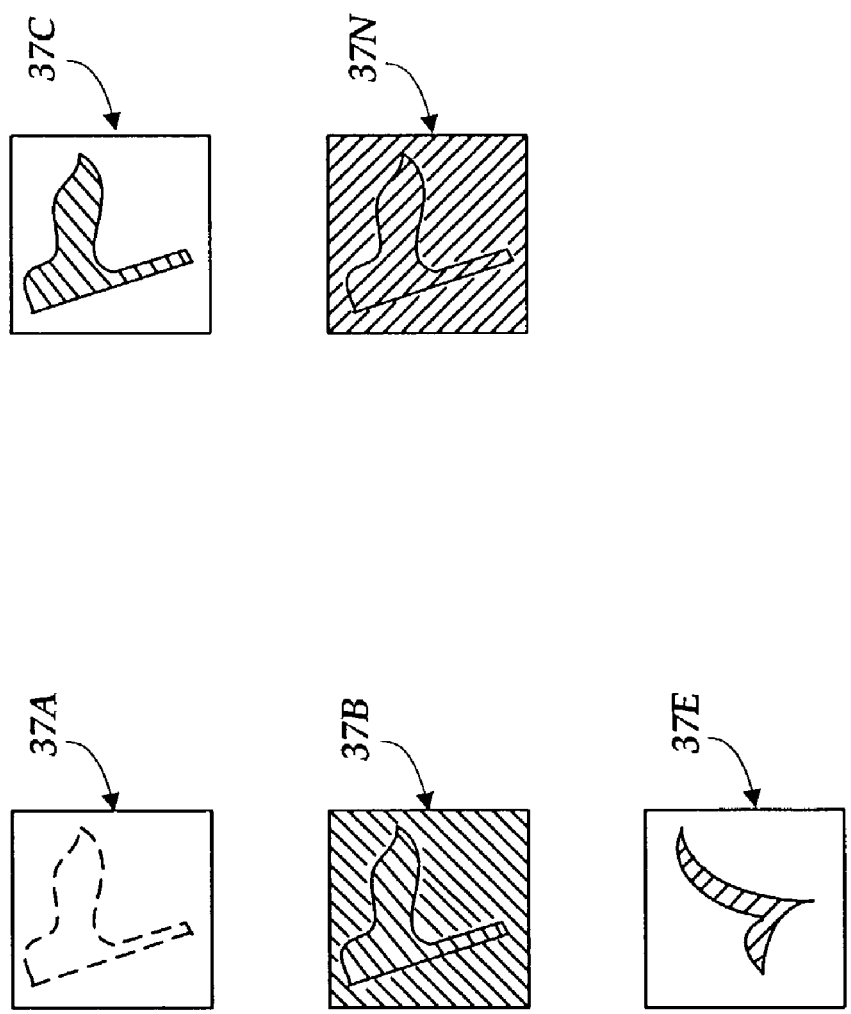

Referring now to FIG. 5, additional aspects of the screen displays provided by the PIM client component 10 in the various embodiments of the invention will be described. As discussed briefly above, the user interface objects 36A-36N are operative to provide screen displays corresponding to the flagged status of an item in a list. FIG. 5 illustrates the various states of the visual displays 37A-37N provided by the user interface controls. In particular, the visual display 37A indicates that a list item has not been flagged by either a current user or another user. According to one embodiment of the invention, the default status of the visual display 37A comprises a flag that has been "ghosted" or "grayed" out. Ghosting or graying an icon is well known to those skilled in the art.

The visual display 37C identifies a visual display provided by a user interface control for an item that has been flagged by another user. In particular, the visual display 37C includes a rectangle surrounding a colored flag. It should be appreciated by that although a flag is described herein as the preferred illustration for indicating to a user that a list item has been flagged, other types of visual indications may be provided. For instance, push pins, stars, or other types of shapes may be utilized in the visual displays 37A-37N.

The visual displays 37B and 37N are utilized for visual displays that have been flagged by a user. The hatched lines shown in FIG. 5 indicate the various colors that have been applied to the visual displays 37A-37N. For instance, the visual display 37B is shaded in a first color while the visual display 37N is shaded in another color.

The visual display 37E provided by a user interface control indicates that the corresponding item in the list 32 has been completed. While a checkmark is utilized to indicate that an item has been completed in one embodiment of the invention, it should be appreciated that other types of visual indicators may be similarly used.

Figure 6:
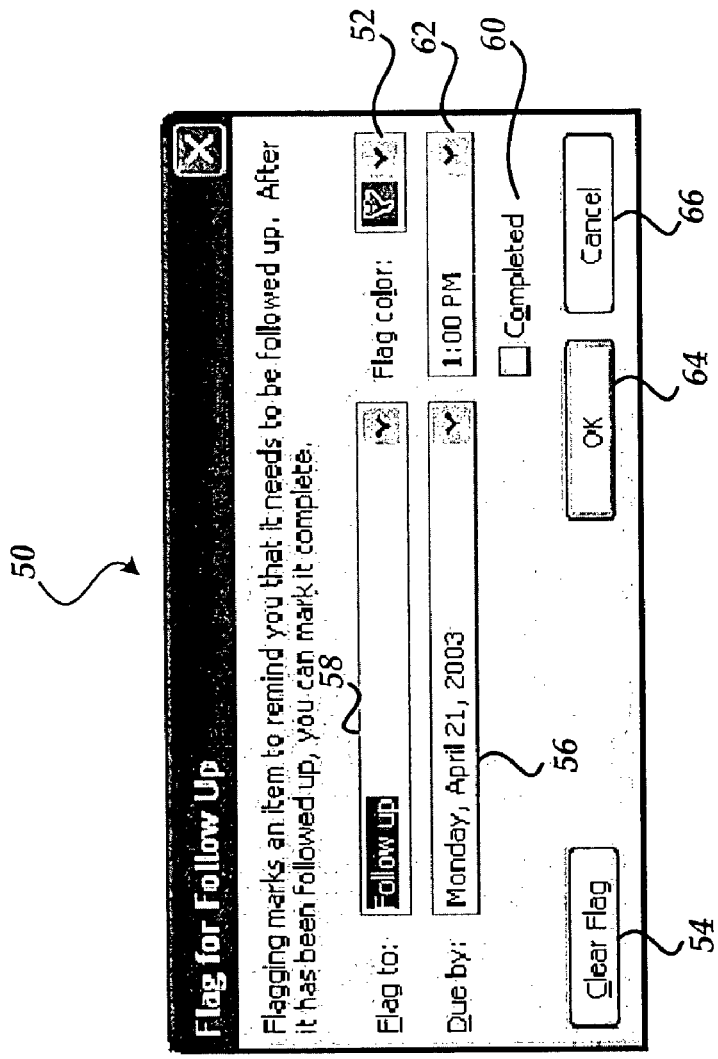

Turning now to FIG. 6, additional details regarding the process for associating a reminder with an item in the list 32 will be described. As discussed above, selection of the menu item 42H from the menu 38 will cause a user interface dialog box to be displayed by the user interface control. The user interface dialog box 50 shown in FIG. 6 comprises one example of such a dialog box.

The user interface dialog box 50 includes an indication to a user that flagging an item in the list 32 marks the item with a reminder to the user that a follow-up should occur for the item. In order to provide the reminder, information regarding the specific nature of the reminder must be obtained from the user. Accordingly, a field 58 is provided in which the user can specify the nature of the reminder, a field 56 and 62 are provided in which a user can specify a date and time at which the item should be completed by. Additionally, a drop-down menu 52 is provided at which the user can specify the color of the visual display provided by the user interface control when providing the visual display for the selected item.

A button 54 is also provided in the dialog box 50 for clearing the flag and a checkbox 60 is provided for setting the status of the selected item as completed. It should be appreciated that the user interface dialog box 50 allows a user to modify all of the settings provided by the user interface control for a particular item in the list 32. Once a user has completed setting properties for the user interface control, the user may select a button 66 to cancel the operation or the button 64 to complete the operation with the specified settings.

Figure 7:
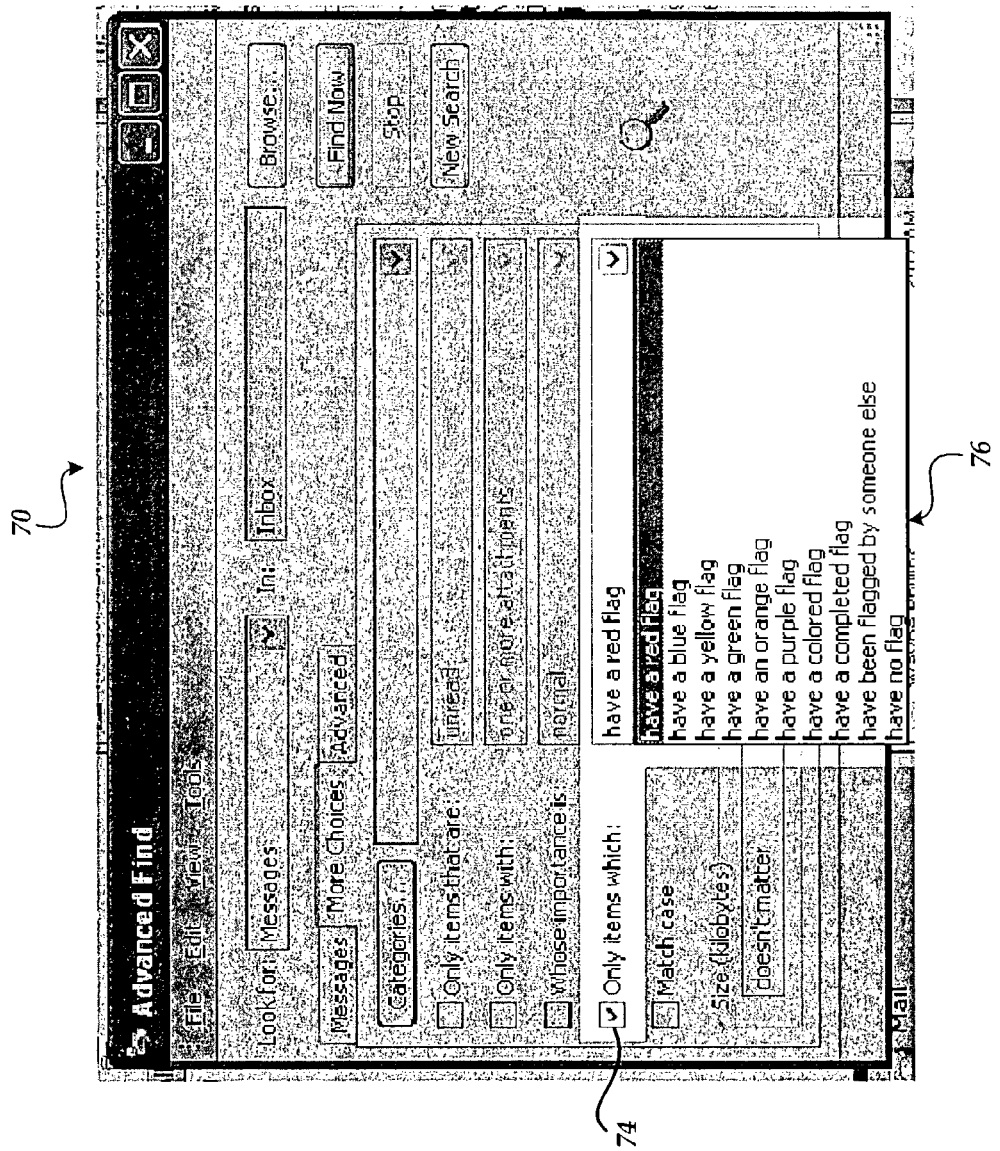

Referring now to FIG. 7, additional details regarding the operation of the various embodiments of the present invention will be described. As discussed briefly above with respect to FIG. 3, the PIM client component 10 includes functionality for searching the various items maintained by the PIM client component 10. In particular, the PIM client component 10 may display a dialog box 70 for finding items. Through the dialog box 70, items stored in various folders maintained by the PIM client component 10 may be located. According to one embodiment of the invention, the dialog box 70 includes functionality for locating items stored in various folders based on the color of the visual display provided by the user interface controls 36A-36N.

As shown in FIG. 7, the user interface dialog box 70 includes a checkbox 74 and a pull-down menu 76. Through these user interface components, a user can specify the parameters for locating messages in any of the folders maintained by the PIM client component 10 having a visual display provided by the user interface control set to a specified color. For instance, through the drop-down menu 76, the user may specify that the search results include only items which include a red flag. Other types of colors may be specified similarly. Additionally, a user may specify through the drop-down menu 76 that only items that have been flagged by another, having a completed flag, or having no flag, be included in the search results. In this manner, the color or status of the flag associated with each of the items in the list 32 may be utilized when searching for items in the list 32.

Figure 8:
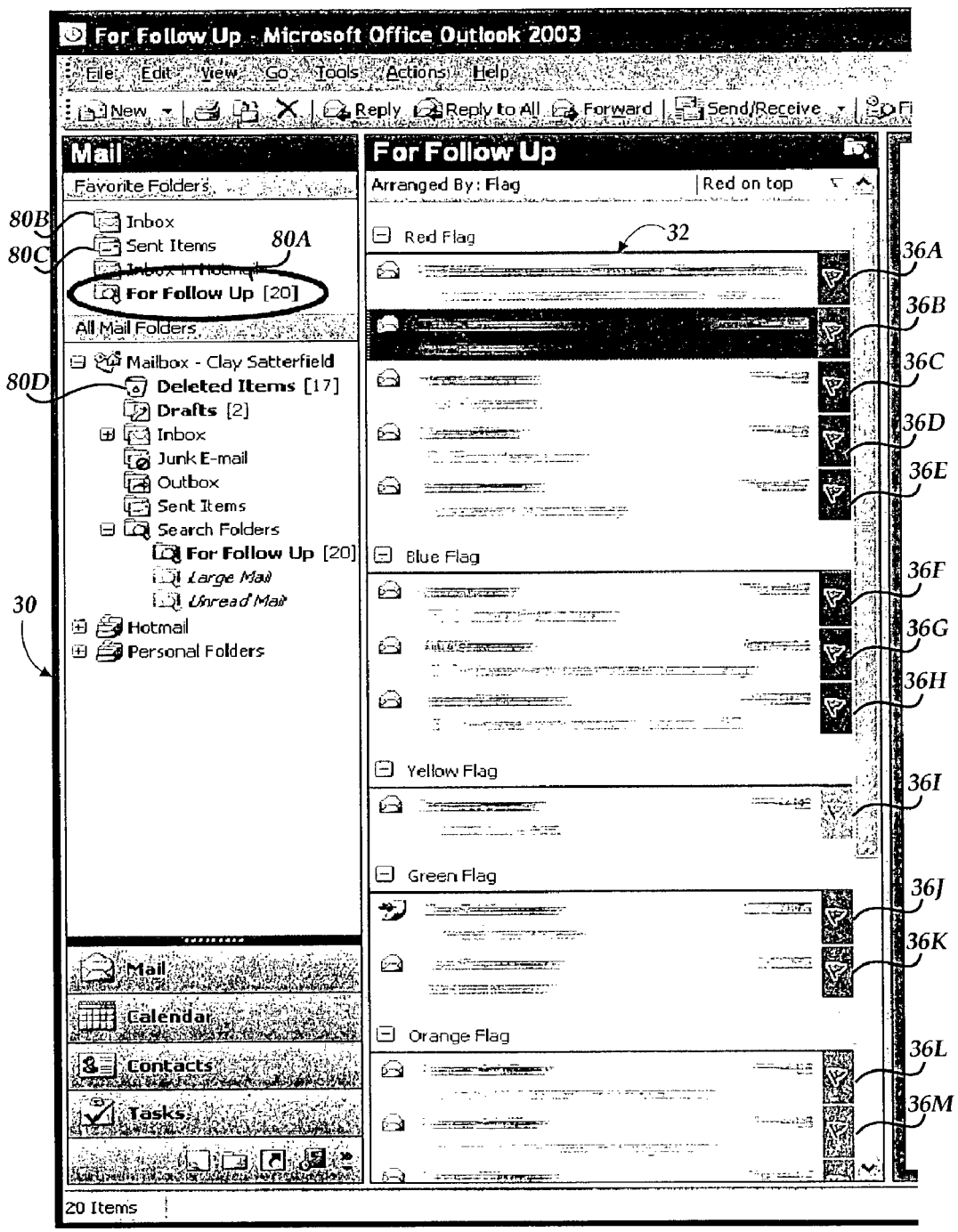

Referring now to FIG. 8, additional details regarding a screen display 30 provided by the PIM client component 10, another embodiment of the invention will be described. As shown in FIG. 8, the PIM client component 10 is operative to maintain a number of folders 80B, 80C, and 80D, in which items, such as e-mail messages, may be stored. For instance, the folder 80B comprises an in-box folder in which new messages are initially stored, the sent items folder 80C comprises a folder in which items that have been sent are stored, and the deleted items folder 80D comprises a folder in which items to be deleted are stored. Storage of e-mail items in folders in this manner is well known to those skilled in the art.

According to one embodiment of the invention, the PIM client component 10 is operative to maintain a "search" folder 80A. When selected, the search folder 80A will cause a search of all of the other folders maintained by the PIM client component 10 to be performed for items having a flagged status. For instance, the folder 80B, the folder 80C, and the folder 80D will be searched for items having a flagged status in response to the selection of the search folder 80A. As a result, the list 32 displayed following the selection of the search folder 80A will include items 36A-36M having visual displays indicating that the items have been flagged. The items 36A-36E include a red flag, the items 36F-36H include a blue flag, the item 36I includes a yellow flag, the items 36J-36K include a green flag, and the items 36L-36M include an orange flag. It should be appreciated that a user can locate all items having a flagged status contained in any of the folders maintained by the PIM client component 10 through a single selection of the search folder 80A.

Referring now to FIG. 9, a state diagram 90 illustrating the various states of the flag associated with each of the items in the list 32 will be described. The field 92 identifies each of the particular states. In the embodiment described herein, twelve different states are possible. The flag type field 94 is utilized to identify the color of the flag associated with a particular item. The flag status field 96 is utilized to identify whether a particular item has been flagged, in unflagged, or is completed. The reminder field 98 describes whether a reminder has been associated with a particular item.

The field 100 identifies for each state the next state that the state diagram 90 will transition to following one selection, such as one mouse click, of a particular item. For instance, in the state 102A, the flag has been assigned a color, is flagged, and no specific time for a reminder has been set. If the associated item is selected one time, the state diagram will transition to state 102D, where the icon for the flag is returned to its default state and the flag status is set to completed.

The state 102B is the state utilized for flags sent by another user. In this state, the item is flagged, but no color is assigned to the item and there is no reminder. The state 102C is the default state. In this state, items have no flag, no color, and no reminder. The meanings of the various other states illustrated in the state diagram 90 should be apparent to those skilled in the art.

The logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto.

Figure 10:
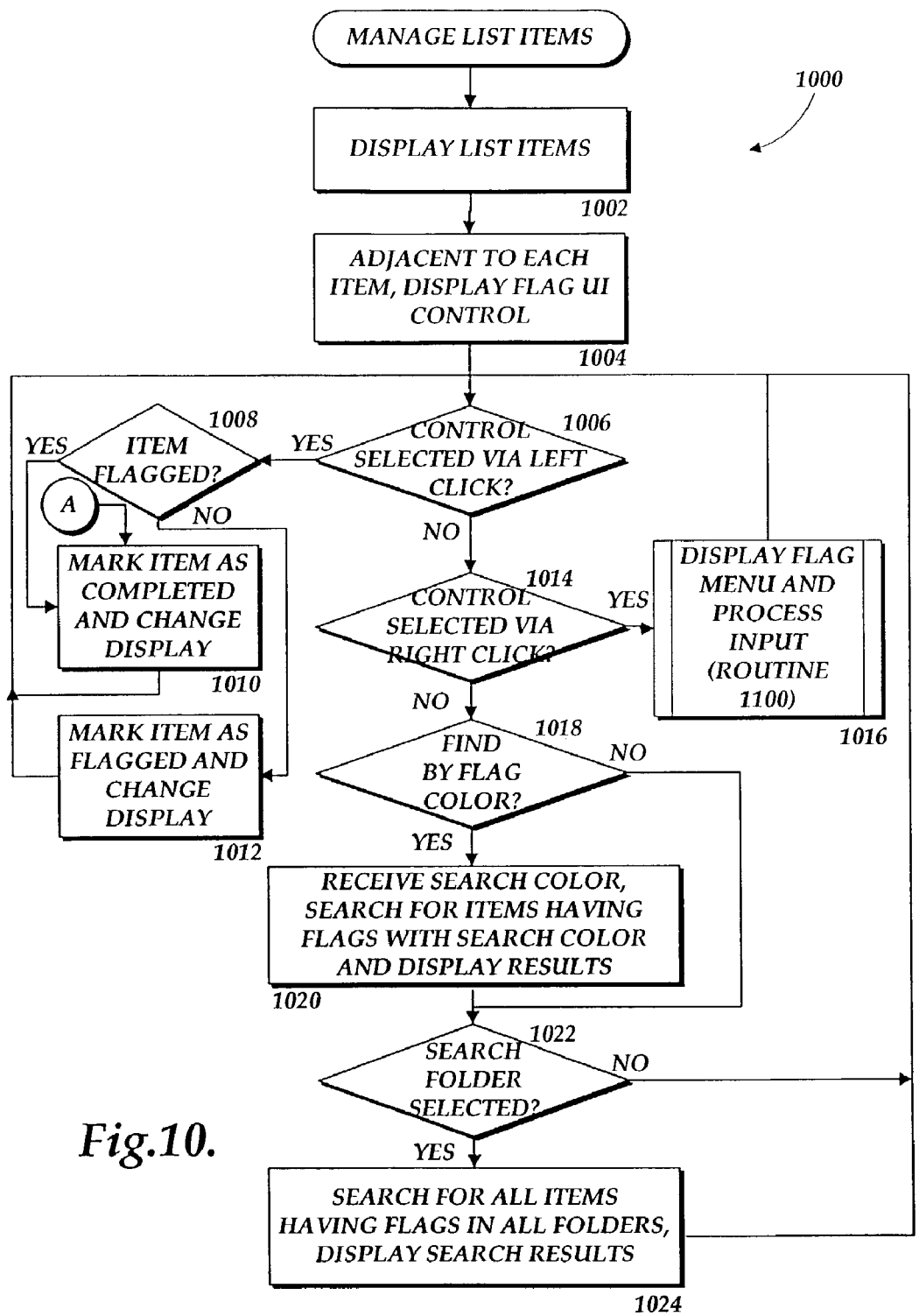
FIGS. 10-11 are flow diagrams illustrating the operation of a user interface control provided in the various embodiments of the invention.

Referring now to FIG. 10, an illustrative routine 1000 will be described for managing items in a list 32. The routine 1000 begins at operation 1002, where the list 32 is displayed, including one or more list items 34A-34N. The routine 1000 then continues to operation 1004, where the user interface controls 36A-36N are displayed adjacent to each item 34A-34N in the list 32. From operation 1004, the routine 1000 continues to operation 1006, where a determination is made as to whether any of the user interface controls 36A-36N have been selected via a left mouse click or a corresponding keyboard key. If such a selection has been made, the routine 1000 branches from decision operation 1006 to operation 1008.

At operation 1008, a determination is made as to whether the item corresponding to the selected user interface control has been previously flagged. If the item has been previously flagged, the routine 1000 branches from decision operation 1008 to operation 1010, where the selected item is marked as completed. Additionally, the visual display provided by the user interface control is modified from a flagged status to a completed status. As described above, this may include changing the display from a flag to a check or displaying other types of visual displays indicating the flagged and unflagged status. From operation 1010, the routine 1000 returns back to decision operation 1006.

If, at operation 1008, it is determined that the selected item has not been previously flagged, the routine 1000 continues to operation 1012. At operation 1012, the item corresponding to the selected user interface control is marked as flagged. Additionally, the visual display provided by the user interface control for the selected item is modified to indicate that the item has been flagged. From operation 1012, the routine 1000 returns back to operation 1006.

If, at decision operation 1006, it is determined that the user interface control has not been selected via a left click or a corresponding keyboard command, the routine 1000 continues to operation 1014. At decision operation 1014, a determination is made as to whether one or the user interface controls 36A-36N has been selected via a right mouse click or corresponding keyboard command. If a user interface control 36A-36N has been selected via a right click or corresponding keyboard command, the routine 1000 branches to operation 1016. At operation 1016, the menu 38 described above with respect to FIG. 4 is displayed and input is received directed toward the menu 38. An illustrative routine for displaying the menu 38 and processing input directed toward the menu 38 is described in greater detail below with respect to FIG. 11. From operation 1016, the routine 1000 returns back to decision operation 1006.

If, at operation 1014, it is determined that a user interface control 36A-36N has not been selected, the routine 1000 continues to decision operation 1018. At decision operation 1018, a determination is made as to whether a user has requested to find items by color or other associated property, such as flag status. If such a request has not been made, the routine 1000 branches from operation 1018 to operation 1022. If, however, a request has been made to find an item by flag color or other flag property, the routine 1000 continues to operation 1020. At operation 1020, the dialog box 70 described with respect to FIG. 7 is displayed. Moreover, parameters for the search such as the color of the flag or other search property to be located is received from the user. Once these properties have been received, the search is performed and the items contained in the list matching the search properties are displayed.

From operation 1020, the routine 1000 continues to decision operation 1022, where a determination is made as to whether a search folder, such as the search folder 80A discussed above with respect to FIG. 8 has been selected by a user. If a search folder has not been selected, the routine 1000 branches from decision operation 1022 to operation 1006. If, however, a search folder has been selected, the routine 1000 continues from operation 1022 to operation 1024. At operation 1024, a search is made of all of the folders maintained by the PIM client component 10 having items contained therein with a flagged state. Once the search has completed, the search results are displayed to the user in the manner described above with respect to FIG. 8. From operation 1024, the routine 1000 returns back to operation 1006.

Figure 11:
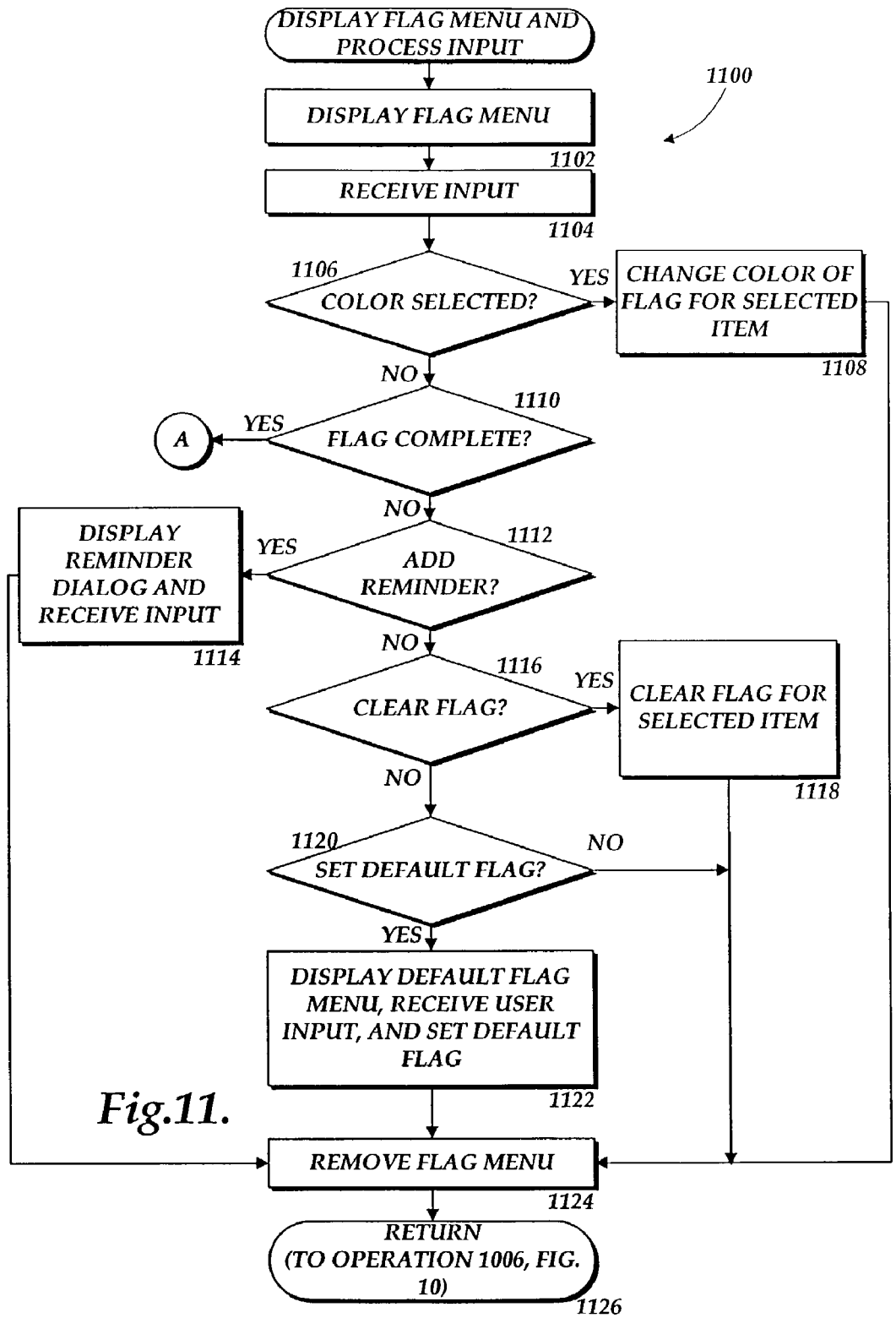

Turning now to FIG. 11, an illustrative routine 1100 will be described for displaying the menu 38 and for receiving input directed toward this menu. The routine 1100 begins at operation 1102, where the menu 38 is displayed. At operation 1104, user input is received directed toward the menu 38, such as mouse or keyboard input. At decision operation 1106, a determination is made as to whether a user has indicated a desire to change the color of the visual display provided by the user interface for the selected item. This would occur typically through the selection of one of the menu items 42A-42C for changing the color of the visual display for the selected item. If such a selection has been made, the routine 1100 branches to block 1108, where the color of the visual display for the selected item is modified based on the user selection. The routine 1100 then continues from operation 1108 to operation 1124.

If, at decision operation 1106, a determination is made that user input was not received from changing the color of the visual display provided by the selected user interface control, the routine 1100 continues to block 1110. At block 1110, a determination is made as to whether the user has selected the menu item 42G for flagging the selected item as completed. If the user has made such a selection, the routine 100 branches back to operation 1010, where the selected item is completed. Operation 1010 is described above with respect to FIG. 10.

If, at block 1110, it is determined that the user has not selected the menu item 42G for flagging the selected item as completed, the routine 1100 continues to block 1112. At block 1112, a determination is made as to whether the user has selected the menu item 42H for adding a reminder to the selected item. If the user has made such a selection, the routine 1100 branches to block 1114, where the dialog box 50 described above with reference to FIG. 6 is displayed and input is received in the manner described above. Once the user has completed utilization of the dialog box 50, the routine 1100 branches from operation 1114 to operation 1124.

If, at operation 1112, it is determined that the user has not selected the menu item 42H, the routine 1100 continues to operation 1116. At operation 1116, a determination is made as to whether the user has selected the menu item 42J for clearing the flag associated with the selected item. If the user has made such a selection, the routine 1100 branches to operation 1118, where the flag is cleared for the selected item in the list 32. The routine 1100 then continues from operation 1118 to operation 1124.

If, at operation 1116, it is determined that the user has not selected the menu item 42J, the routine 1100 continues to operation 1120, where a determination is made as to whether the user has selected the menu item 42K for selecting the color of the default visual display provided by the user interface control for the selected item. If the user has not selected the menu item 42K, the routine 1100 branches to block 1124. If, however, the user has selected the menu item 42K, the routine 1100 continues to block 1122, where the menu 40 is displayed. User input selecting one of the items 44A-44N is then received from the user. Based on the user selection, the color of the default visual display provided by the user interface control for the selected item is modified.

From operation 1122, the routine 1100 continues to operation 1124, where the menu 38 is removed. From operation 1124, the routine 1100 continues to operation 1124, where the menu 38 is removed. From operation 1124, the routine 1100 continues to operation 1126 where it returns to operation 1006, discussed above with respect to FIG. 10.

Based on the foregoing, it should be appreciated that the various embodiments of the invention include a method, system, apparatus, and computer-readable medium for managing items in a list. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for managing a list comprising at least one item, the method comprising:

displaying each of the items in the list;

displaying adjacent to each item in the list a user interface control for flagging the adjacent item, the user interface control comprising a visual display for indicating to a user at least one of a plurality of predetermined and different flags associated with the item, wherein the visual display for indicating to a user at least one of a plurality of predetermined and different flags associated with the item comprises items not flagged, items flagged by the user, and items flagged by another user, wherein the visual display indicating items flagged by the user and items flagged by another user appearing different to the user;

receiving a first selection of the user interface control corresponding to an item in the list;

in response to the first selection, modifying the visual display to indicate that the item associated with the selected user interface control has been flagged with one of the plurality of predetermined and different flags and setting a property of the item associated with the selected user interface control to a flagged state indicating one of the plurality of predetermined and different flags.

2. The method of claim 1, further comprising receiving a second selection of the user interface control corresponding to an item in the list and, in response to the selection, setting the property of the item associated with the selected user interface control to a completed state.

3. The method of claim 2, further comprising modifying a visual appearance of the user interface control in response to the second selection.

4. The method of claim 3, wherein the user interface control for each item comprises a color property and wherein modifying the visual display comprises displaying at least a portion of the user interface control in a color determined by the value of the color property.

5. The method of claim 4, further comprising:

receiving a request to sort the items in the list based on the value of the color property associated with each user interface control displayed adjacent to items in the list;

in response to the request, sorting the list based on the value of the color property associated with each user interface control displayed adjacent to items in the list; and displaying the sorted list.

6. The method of claim 5, further comprising:

receiving a request to search for items in the list having a specified value of the color property associated with the corresponding user interface control;

in response to the request, searching the list for items having a corresponding user interface control with a color property value equivalent to the specified value; and displaying the located items.

7. The method of claim 6, wherein items in the list may be sorted into a plurality of folders and wherein the method further comprises:
- receiving a request to display items located in any of the plurality of folders having a specified value of the color property associated with the corresponding user interface control;
- in response to the request, searching the plurality of folders for items having a corresponding user interface control with a color property value equivalent to the specified value; and
- displaying the located items.

8. A physical computer storage medium having stored thereon computer-readable instructions which, when executed by a computer, cause the computer to perform the method of claim 1.

9. A computer-controlled apparatus capable of performing the method of claim 1.

10. The method of claim 1, where in response to the first selection, displaying an indication of each of the plurality of predetermined different flags proximate the user interface control and further comprising receiving a second selection of the one of the plurality of predetermined and different flags.

11. The method of claim 1, where the one of the plurality of predetermined and different flags is a default flag of the plurality of predetermined and different flags.

12. The method of claim 1, wherein the user interface control displayed adjacent to each item in the list comprises a shape.

13. The method of claim 12, further comprising:
- receiving a request to select items in the list based on the flagged state of the item associated with the selected user interface control;
- in response to the request, selecting items in the list based on the flagged state of the item associated with the selected user interface control; and
- displaying a list of the selected items.

14. The method of claim 12, wherein the shape of the user interface control displayed adjacent to each item in the list is selected from the list comprising one of the following: a star, a flag, a push-pin, a geometric shape, and a checkmark.

15. A method for managing a list comprising at least one item, the method comprising:
- displaying the list of items;
- displaying adjacent to each item in the list a user interface control associated with each item, the user interface control a visual display for indicating to a user at least one of a plurality of predetermined and different flags associated with the item, wherein the visual display for indicating to a user at least one of a plurality of predetermined and different flags associated with the item comprises items not flagged, items flagged by the user, and items flagged by another user, wherein the visual display indicating items flagged by the user and items flagged by another user appearing different to the user;
- receiving a first selection of the user interface control associated with an item in the list;
- in response to receiving the first selection, modifying the visual display to indicate that the item associated with the selected user interface control has been flagged with one of the plurality of predetermined and different flags, and setting a property of the item associated with the selected user interface control to a flagged state indicating one of the plurality of predetermined and different flags.

16. The method of claim 15, further comprising:
- receiving a second selection of the user interface control associated with the item in the list; and
- in response to receiving the selection, modifying the visual display provided by the user interface control to indicate that the item associated with the selected user interface control is completed.

17. The method of claim 16, wherein the user interface control is further operative to receive a request to change a color of the visual display, to display at least one selectable color in response to the request, to receive the selection of a one of the at least one color, and to modify the visual display based on the selected color.

18. The method of claim 17, wherein the user interface control is further operative to receive a request to associate a reminder with the item associated with the selected user interface control and, in response to the request, to associate the reminder with the item associated with the selected user interface control.

19. The method of claim 18, further comprising:
- receiving a request to sort the items in the list based on color of the display provided by the user interface control,
- in response to the request, sorting the list based on the color of the display provided by each user interface control associated with an item in the list; and
- displaying the sorted list.

20. The method of claim 19, further comprising:
- receiving a request to search for items in the list having a specified color of the display provided by the corresponding user interface control;
- in response to the request, searching the list for items having a corresponding user interface control providing a display with a color equivalent to the specified color; and
- displaying the located items.

21. The method of claim 20, wherein items in the list may be sorted into a plurality of folders and wherein the method further comprises:
- receiving a request to display items located in any of the plurality of folders having a display provided by the user interface control with a specified color;
- in response to the request, searching the plurality of folders for items having a display provided by the corresponding user interface control with a color equivalent to the specified color; and
- displaying the located items.

22. A physical computer storage medium having stored thereon computer-readable instructions which, when executed by a computer, cause the computer to perform the method of claim 15.

23. A computer-controlled apparatus capable of performing the method of claim 15.

* * * * *